United States Patent
Zhang et al.

(10) Patent No.: US 9,843,097 B1
(45) Date of Patent: Dec. 12, 2017

(54) MIMO IMPLICIT BEAMFORMING TECHNIQUES

(71) Applicant: MARVELL INTERNATIONAL LTD., Hamilton (BM)

(72) Inventors: Hongyuan Zhang, Fremont, CA (US); Sudhir Srinivasa, Campbell, CA (US)

(73) Assignee: Marvell International Ltd., Hamilton (BM)

( * ) Notice: Subject to any disclaimer, the term of this patent is extended or adjusted under 35 U.S.C. 154(b) by 675 days.

(21) Appl. No.: 14/325,027

(22) Filed: Jul. 7, 2014

Related U.S. Application Data

(60) Provisional application No. 61/843,753, filed on Jul. 8, 2013.

(51) Int. Cl.
*H01Q 3/40* (2006.01)
*H04B 7/04* (2017.01)

(52) U.S. Cl.
CPC .............. *H01Q 3/40* (2013.01); *H04B 7/0421* (2013.01)

(58) Field of Classification Search
CPC ........ H01Q 3/40; H01Q 7/0421; H01Q 7/024; H01Q 7/0413; H01Q 7/0417; H01Q 7/0452; H01Q 7/0495; H04B 7/0421; H04B 7/024; H04B 7/0413; H04B 7/0417; H04B 7/0452
See application file for complete search history.

(56) References Cited

U.S. PATENT DOCUMENTS

| | | | |
|---|---|---|---|
| 6,862,440 | B2 | 3/2005 | Sampath |
| 7,194,042 | B2 | 3/2007 | Walton et al. |
| 7,206,354 | B2 | 4/2007 | Wallace et al. |

(Continued)

FOREIGN PATENT DOCUMENTS

| | | |
|---|---|---|
| WO | WO-2007/103085 | 9/2007 |
| WO | WO-2012/162576 | 11/2012 |

OTHER PUBLICATIONS

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-512 (1999).

(Continued)

*Primary Examiner* — Cassie Galt

(57) ABSTRACT

In a method for beamforming in a multiple input multiple output (MIMO) communication system, a data unit from a second communication device is received at a first communication device via a MIMO communication channel. Training signals in the data unit are buffered in a memory of the first communication device, wherein buffering assumes that the data unit spans a bandwidth greater than a maximum bandwidth of a legacy first communication protocol. The first communication device determines whether the data unit is formatted according to a duplication mode in which a bandwidth portion of the data unit conforms to the legacy first communication protocol. If it is determined that the data unit is formatted according to the duplication mode, the first communication device utilizes a transmit beamforming matrix generated using the training signals buffered assuming that the data unit spans the bandwidth greater than the maximum bandwidth of the legacy first communication protocol.

20 Claims, 8 Drawing Sheets

(56) References Cited

U.S. PATENT DOCUMENTS

| | | |
|---|---|---|
| 7,486,740 B2 | 2/2009 | Inanoglu |
| 7,599,332 B2 | 10/2009 | Zelst et al. |
| 7,729,439 B2 | 6/2010 | Zhang et al. |
| 7,742,390 B2 | 6/2010 | Mujtaba |
| 7,917,107 B2 | 3/2011 | Gu et al. |
| 8,155,138 B2 | 4/2012 | van Nee |
| 8,270,909 B2 | 9/2012 | Zhang et al. |
| 8,289,869 B2 | 10/2012 | Sawai |
| 8,340,597 B1 | 12/2012 | Nabar et al. |
| 8,526,351 B2 | 9/2013 | Fischer et al. |
| 8,619,907 B2 | 12/2013 | Mujtaba et al. |
| 8,644,368 B1 | 2/2014 | Zhang et al. |
| 8,724,720 B2 | 5/2014 | Srinivasa et al. |
| 8,891,597 B1 | 11/2014 | Zhang et al. |
| 8,891,640 B2 | 11/2014 | Nabar et al. |
| 8,971,178 B1 | 3/2015 | Nabar et al. |
| 2005/0052991 A1 | 3/2005 | Kadous |
| 2005/0078762 A1 | 4/2005 | Ketchum et al. |
| 2005/0185728 A1 | 8/2005 | Wallace et al. |
| 2006/0063492 A1 | 3/2006 | Iacono et al. |
| 2006/0093067 A1 | 5/2006 | Jalali et al. |
| 2006/0126752 A1 | 6/2006 | Hansen et al. |
| 2007/0041457 A1 | 2/2007 | Kadous et al. |
| 2007/0230373 A1 | 10/2007 | Li et al. |
| 2008/0014870 A1 | 1/2008 | Kim |
| 2008/0089396 A1 | 4/2008 | Zhang et al. |
| 2008/0219373 A1 | 9/2008 | Zhang et al. |
| 2009/0097395 A1 | 4/2009 | Zhang et al. |
| 2009/0196163 A1 | 8/2009 | Du |
| 2009/0221241 A1 | 9/2009 | Ghosh |
| 2010/0046358 A1 | 2/2010 | van Nee |
| 2010/0091673 A1 | 4/2010 | Sawai et al. |
| 2010/0104038 A1 | 4/2010 | Stager et al. |
| 2010/0172425 A1 | 7/2010 | Pare, Jr. et al. |
| 2010/0309834 A1 | 12/2010 | Fischer et al. |
| 2011/0002219 A1 | 1/2011 | Kim et al. |
| 2011/0019768 A1 | 1/2011 | Nammi et al. |
| 2012/0039196 A1 | 2/2012 | Zhang |
| 2012/0328034 A1 | 12/2012 | Nabar et al. |

OTHER PUBLICATIONS

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

IEEE P802.11n™/D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-91 (Sep. 1999).

IEEE Std 802.11b-1999/Cor 1-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, pp. 1-23 (Nov. 7, 2001).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band, " *The Institute of Electrical and Electronics Engineers, Inc.*, pp. 1-69 (Apr. 2003).

IEEE Std. 802.11 $n^{TM}$ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

IEEE Std. 802.11 n™/D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).

IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).

IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).

IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).

IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements

(56) References Cited

OTHER PUBLICATIONS for Very High Throughput for Operation in Bands below 6 GHz," *The Institute of Electrical and Electronics Engineers, Inc.*, pp. 1-446 (Jul. 2013).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE Std 802.16-2009 (Revision of IEEE Std. 802.16-2004), IEEE Standard for Local and metropolitan area networks: Part 16: Air Interface for Broadband Wireless Access Systems, *The Institute of Electrical and Electronics Engineers, Inc.*, 2082 pages. (May 29, 2009).

IEEE Std 802.16e-2005 and IEEE Std 802.16-2004/Cor1-2005 (Amendment and Corrigendum to IEEE Std 802.16-2004), IEEE Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1, *The Institute of Electrical and Electronics Engineers, Inc.*, pp. 1-864 (Feb. 28, 2006).

IEEE Std 802.16™-2012 (Revision of IEEE Std. 802.16-2009), IEEE Standard for Air Interface for Broadband Wireless Access Systems: Part 1—Beginning through Section 7, IEEE Computer Society and the IEEE Microwave Theory and Techniques Society, *The Institute of Electrical and Electronics Engineers, Inc.*, 2558 pages. (Aug. 17, 2012).

IEEE 802.20-PD-06; IEEE P 802.20™V14, Draft 802.20 Permanent Document; <System Requirements for IEEE 802.20 Mobile Broadband Wireless Access Systems—Version 14>, 24 pages (Jul. 16, 2004).

Ansari et al., "Unified MIMO Pre-Coding Based on Givens Rotation," *The Institute of Electrical and Electronics Engineers*, doc. No. IEEE C802.16e-04/516r2, pp. 1-13, (Jan. 11, 2005).

Gunnam et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

Love et al., "An Overview of Limited Feedback in Wireless Communication Systems," IEEE J. on Selected Areas in Communications, vo. 26, No. 8, pp. 1341-1365 (Oct. 2008).

Mujtaba, "IEEE P802.11-Wireless LANs, TGn Sync Proposal Technical Specification," *The Institute of Electrical and Electronics Engineers, Inc.*, doc.: IEEE 802.11—04/0889r6, pp. 1-131 (May 2005).

Perahia et al., "Gigabit Wireless LANs: an overview of IEEE 802.11ac and 80211ad," ACM SIGMOBILE Mobile Computing and Communications Review, vo. 15, No. 3, pp. 23-33 (Jul. 2011).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, *Institute for Electrical and Electronics Engineers*, pp. 1-49, (Jan. 18, 2011).

van Nee et al. "The 802.11 n. MIMO-OFDM Standard for Wireless LAN and Beyond," Wireless Personal Communications, vol. 37, pp. 445-453 (Jun. 2006).

Zhang et al., "11 ac Explicit Sounding and Feedback", *The Institute of Electrical and Electronics Engineers*, doc. No. IEEE 802.11-10/1105r0, 44 pages (Sep. 2010).

Zhang et al., "Applying Antenna Selection in WLANs for Achieving Broadband Multimedia Communications," *IEEE Trans. on Broadcasting*, vol. 52, No. 4, pp. 475-482 (Dec. 2006).

MIMO IMPLICIT BEAMFORMING TECHNIQUES

CROSS-REFERENCES TO RELATED APPLICATIONS

This disclosure claims the benefit of U.S. Provisional Patent Application No. 61/843,753, entitled "MIMO Implicit Beamforming Based on Legacy Packet," filed on Jul. 8, 2013, which is hereby incorporated by reference herein in its entirety.

FIELD OF TECHNOLOGY

The present disclosure relates generally to wireless communication systems and, more particularly, to beamforming techniques used in wireless communication systems.

BACKGROUND

In some wireless communication systems, one or more communication devices employ multiple antennas. Accordingly, a communication channel between two such devices can be i) a multiple-input, multiple-output (MIMO) channel when both communication devices employ multiple antennas, ii) a single-input, multiple-output (SIMO) channel when a transmitting device ("the transmitter") employs a single transmit antenna and the receiving device ("the receiver") employs multiple receive antennas, or iii) a multiple-input, single-output (MISO) channel the transmitter employs multiple transmit antennas and the receiver employs a single receive antenna. Referring for simplicity to transmit beamforming, transmission and reception properties in these systems can be improved by using each of the various transmit antennas to transmit the same signal while phasing (and amplifying) this signal as the signal is provided to the various transmit antennas to achieve beamforming or beamsteering. Generally speaking, beamforming or beamsteering creates a spatial gain pattern having one or more lobes or beams (as compared to the gain obtained by an omni-directional antenna) in one or more particular directions, while generally reducing the gain over that obtained by an omni-directional antenna in other directions. If the gain pattern is configured to produce a high gain lobe in the direction of each of the receiver antennas or in the direction of the receiver antennas in general, the MIMO system can obtain better transmission reliability between a particular transmitter and a particular receiver, over that obtained by single transmit-antenna/receive-antenna systems.

To conduct beamforming in the direction of a receiver, a transmitter generally utilizes a steering matrix determined based on specifics of the forward channel (i.e., the channel from the transmitter to the receiver) to condition the signals applied to various transmit antennas so as to produce the desired transmit gain pattern. In a technique known as explicit beamforming, to determine the specifics of the forward channel, such as the channel state information (CSI) or other measured description of the forward channel, the transmitter first sends training data to the receiver, which receiver then determines or estimates characteristics of the forward channel and/or determines a steering matrix that specifies beamsteering coefficients to be used by the transmitter, and then transmits this information back to the transmitter. The transmitter, in turn, receives the forward channel information (or steering matrix) from the receiver and utilizes this information to create the desired gain pattern in subsequent transmissions to the receiver. Explicit beamforming typically uses one of three types of feedback channel descriptions, which are describe in the context of an access point (AP) and a client station for ease of explanation. With channel state information (CSI) feedback, the client station estimates the downlink (e.g., forward) channel from a sounding packet transmitted by the AP and feeds back the estimated channel gains. With uncompressed steering matrix feedback, the client station, based on the channel estimate from a sounding packet from the AP, determines the steering matrix that is to be used at the AP. The client station then feeds back this steering matrix, without compression. With compressed steering matrix feedback, a similar process occurs, but the steering matrix is fed back in a compressed form.

On the other hand, in implicit beamforming, the transmitter determines specifics of the reverse channel (the channel from the receiver to the transmitter) based on training signals that the transmitter receives from the receiver and estimates the forward channel from the reverse channel by assuming channel reciprocity.

Beamforming typically involves a protocol for transmitting training signals and feeding back CSI or beamsteering coefficients (i.e., a beamforming training protocol). Some communication devices, however, do not support beamforming training protocols and therefore cannot explicitly participate in beamforming training. Some beamforming techniques are described in "IEEE Std. 802.11n™ IEEE Standard for Information Technology-Telecommunications and information exchange between systems-Local and metropolitan area networks-Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, October 2009.

SUMMARY

In an embodiment, a method for beamforming in a multiple input multiple output (MIMO) communication system includes receiving, at a first communication device, a data unit from a second communication device via a MIMO communication channel, and buffering, in a memory of the first communication device, training signals in the data unit, wherein buffering assumes that the data unit spans a bandwidth greater than a maximum bandwidth of a legacy first communication protocol. The method also includes determining, at the first communication device, whether the data unit is formatted according to a duplication mode in which a bandwidth portion of the data unit conforms to the legacy first communication protocol. The method further includes, if it is determined that the data unit is formatted according to the duplication mode, utilizing, at the first communication device, a transmit beamforming matrix generated using the training signals buffered assuming that the data unit spans the bandwidth greater than the maximum bandwidth of the legacy first communication protocol.

In another embodiment, an apparatus is for use in a communication system having a first communication device and a second communication device. The apparatus comprises a network interface device configured to receive a data unit from the second communication device via a MIMO communication channel, buffer, in a memory of or coupled to the network interface device, training signals in the data unit, wherein buffering assumes that the data unit spans a bandwidth greater than a maximum bandwidth of a legacy first communication protocol, determine whether the data unit is formatted according to a duplication mode in which a bandwidth portion of the data unit conforms to the legacy first communication protocol, and if is determined that the data unit is formatted according to the duplication mode, utilize a transmit beamforming matrix generated using the training signals buffered assuming that the data unit spans the bandwidth greater than the maximum bandwidth of the legacy first communication protocol.

In yet another embodiment, a method for beamforming in a MIMO communication system includes receiving, at a first communication device, a data unit from a second communication device via a MIMO communication channel, and buffering, in a memory of the first communication device, training signals in the data unit, wherein buffering assumes that the data unit spans a bandwidth greater than a maximum bandwidth of a legacy first communication protocol. The method also includes determining, at the first communication device, whether the data unit is formatted such that at least a bandwidth portion of the data unit conforms to the legacy first communication protocol, and determining, at the first communication device, whether the data unit is of a type that a second communication protocol requires to be transmitted in a duplication mode such that the data unit would span a bandwidth greater than the maximum bandwidth of the legacy first communication protocol. The method further includes, if is determined that i) the data unit is formatted such that at least the bandwidth portion of the data unit conforms to the legacy first communication protocol, and ii) the data unit is of a type that the second communication protocol requires to be transmitted in the duplication mode, utilizing, at the first communication device, a transmit beamforming matrix generated using the training signals buffered assuming that the data unit spans the bandwidth greater than the maximum bandwidth of the legacy first communication protocol.

In still another embodiment, an apparatus is for use in a communication system having a first communication device and a second communication device. The apparatus comprises a network interface device configured to receive a data unit transmitted by a second communication device via a MIMO communication channel, buffer, in a memory of or coupled to the network interface device, training signals in the data unit, wherein the buffering assumes that the data unit spans a bandwidth greater than a maximum bandwidth of a legacy first communication protocol, determine whether the data unit is formatted such that at least a bandwidth portion of the data unit conforms to the legacy first communication protocol, determine whether the data unit is of a type that a second communication protocol requires to be transmitted in a duplication mode such that the data unit would span a bandwidth greater than the maximum bandwidth of the legacy first communication protocol, and if is determined that i) the data unit is formatted such that at least the bandwidth portion of the data unit conforms to the legacy first communication protocol, and ii) the data unit is of a type that the second communication protocol requires to be transmitted in the duplication mode, utilize a transmit beamforming matrix generated using the training signals buffered assuming that the data unit spans the bandwidth greater than the maximum bandwidth of the legacy first communication protocol.

DETAILED DESCRIPTION

While the beamforming techniques described herein for processing and effecting a wireless data transmission are described as being used in communication systems that use one of the IEEE Standard 802.11 communication standards (e.g., IEEE 802.11ac), these techniques may be used in various other types of wireless communication systems and are not limited to those conforming to one or more of the IEEE Standard 802.11 standards. For example, these techniques may be used in communication systems based on the IEEE 802.16e, 802.16j, or 802.16m standards (known as "WiMAX"), mobile telephony communication systems, etc.

Figure 1:
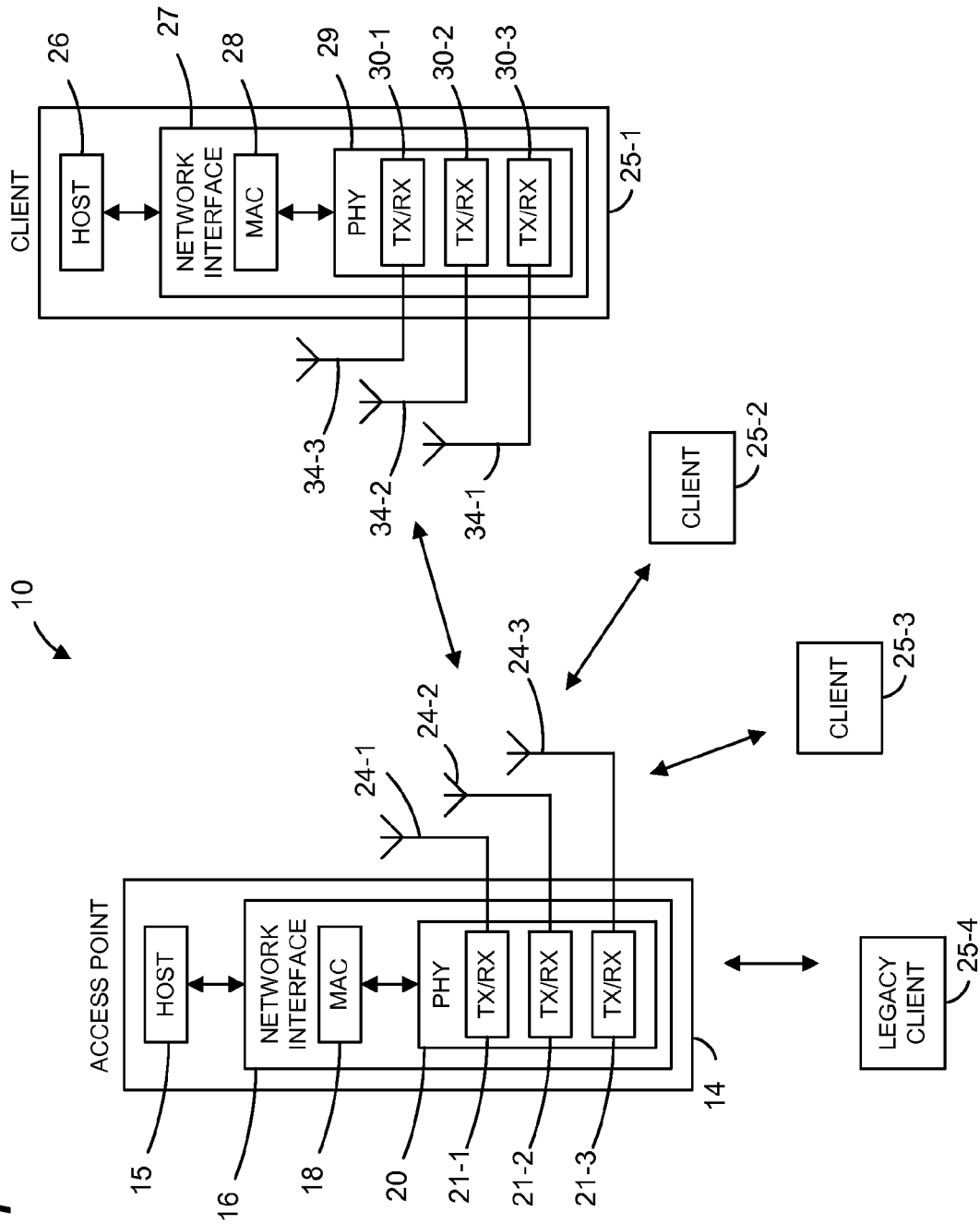
FIG. 1 is a block diagram of an example wireless local area network (WLAN) that utilizes implicit beamforming techniques such as disclosed herein, according to an embodiment.

FIG. 1 is a block diagram of an example wireless local area network (WLAN) 10 that utilizes implicit beamforming techniques such as described in the present disclosure, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include a different number (e.g., 1, 2, 4, 5, etc.) of transceivers and antennas in other embodiments. In one embodiment, the MAC processing unit 18 and the PHY processing unit 20 are configured to operate according to a first communication protocol (e.g., the IEEE 802.11ac standard (now in the standardization process), etc.) which supports certain frame exchanges and other procedures specifically related to explicit and/or implicit beamforming. In another embodiment, the MAC processing unit 18 and the PHY processing unit 20 are alternatively or additionally configured to operate according to a second communication protocol, which does not explicitly support beamforming (e.g., the IEEE 802.11g standard, the IEEE 802.11a standard, etc.). The second communication protocol is herein referred to as a "legacy protocol."

The WLAN 10 includes a plurality of client stations 25. Although four client stations 25 are illustrated in FIG. 1, the WLAN 10 can include a different number (e.g., 1, 2, 3, 5, 6, etc.) of client stations in various scenarios and embodiments. At least one of the client stations 25 (e.g., client station 25-1) is configured to operate at least according to the first communication protocol. The WLAN 10 also includes a client station 25-4 that is not configured to operate according to the first communication protocol but is configured to operate according to a legacy protocol, in some embodiments. Accordingly, the client station 25-4 does not explicitly support frame exchanges or other procedures specifically related to beamforming. Such a client station 25-4 is referred to herein as a "legacy client station." In some embodiments and/or scenarios, the WLAN 10 includes more than one legacy client station. In other embodiments and/or scenarios, the WLAN 10 includes no legacy client stations.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include a different number (e.g., 1, 2, 4, 5, etc.) of transceivers and antennas in other embodiments.

In an embodiment, one or more of the client stations 25-2, 25-3, and 25-4 have a structure the same as or similar to the client station 25-1 (except that at least the client station 25-4 is not configured to explicitly support frame exchanges or other procedures specifically related to beamforming). In these embodiments, the client stations 25 structured the same as or similar to the client station 25-1 have the same or a different number of transceivers and antennas. For example, the client station 25-2 has only two transceivers and two antennas (not shown), according to an embodiment.

In some embodiments, the AP 14 utilizes implicit beamforming for communication with one or more of the client stations 25 in order to increase signal directivity in the direction of the client station(s) 25 and to thereby improve received signal quality (e.g., SNR) at the client station(s) 25. Generally speaking, to conduct implicit beamforming, according to an embodiment, a first communication device (e.g., the AP 14) determines the CSI or other measured description of the reverse channel, i.e., the channel from a second communication device (e.g., client station 25-1) to the first communication device, from training signal(s) sent from the second communication device to the first communication device. In a "standard" implicit beamforming procedure, the first communication device transmits, to the second communication device, a data unit that includes a request to transmit a sounding frame (or packet) that "sounds" the reverse channel from the second communication device to the first communication device thereby allowing the first communication device to fully determine or estimate characteristics of the reverse channel. The first communication device then computes an estimate of the forward channel based on the estimate of the reverse channel by assuming channel reciprocity and, based on the forward channel estimate, generates a steering matrix specifying the beamsteering coefficients that are then applied to the signals to be transmitted to the second communication device to produce the desired transmit gain pattern at the transmitter output.

Figure 2:
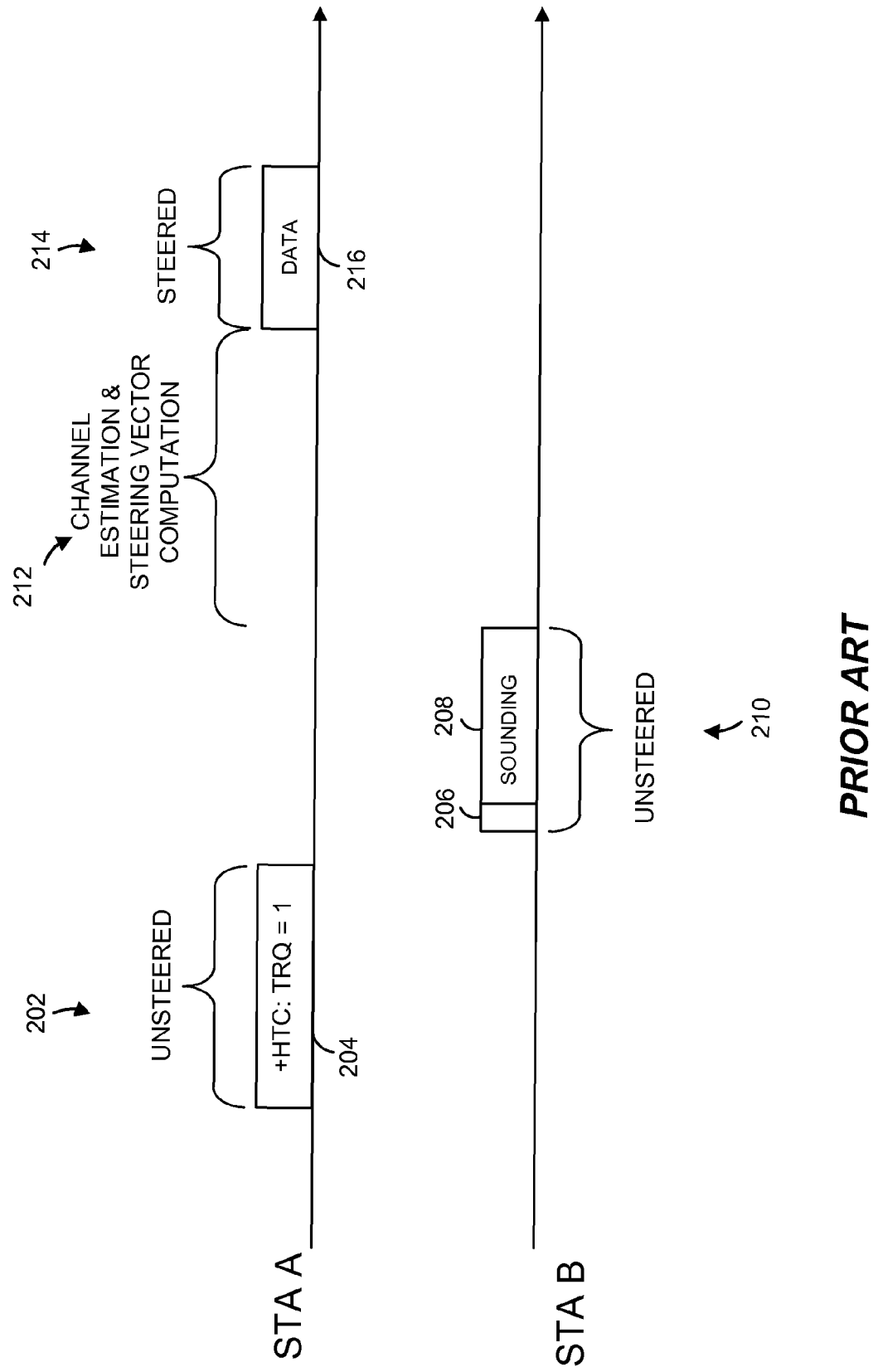
FIG. 2 is a timing diagram of a prior art implicit beamforming technique.

For explanatory purposes, FIG. 2 is a timing diagram illustrating a standard implicit beamforming technique conducted by two devices supporting implicit beamforming, such as Station A and Station B, over a MIMO communication channel. The technique illustrated in FIG. 2 is specified in the IEEE 802.11n Standard. Station A in FIG. 2 is a beamformer (i.e., a device that transmits a data unit using a steering matrix) and Station B is a beamformee (i.e., a device that receives a data unit transmitted using a steering matrix). During a time interval 202, Station A transmits a high throughput control (HTC) frame 204 that specifies a request to transmit a sounding frame (TRQ).

In response to receiving the frame 204, the implicit-beamforming-capable Station B transmits a sounding packet 208 having several training fields in a portion 206 so as to enable Station A to accurately estimate the reverse MIMO channel (i.e., the MIMO channel from Station B to Station A). In particular, as each training field is transmitted, Station B applies a different mapping of symbols to spatial streams, and the number of training fields usually corresponds to the number of spatial or space-time streams used for modulating data packets transmitted from Station B to Station A. When the sounding packet 208 is a null-data packet (NDP), the sounding packet does not include a payload. On the other hand, in a technique known as "staggered sounding," the sounding packet 208 is a data packet that generally carries payload information from Station B to Station A, but, if necessary, includes more training fields than the number of spatial or space-time streams used for transmitting data. In such situations, the extra training fields included in the sounding packet 208 allow the Station A to obtain a full dimensional channel estimate of the communication channel between Stations A and B based on a packet that does not utilize all available dimensions for the data portion of the packet. In general, the sounding packet 208 is not transmitted between Stations A and B during procedures other than the sounding procedure.

During a time interval 212, Station A estimates the MIMO channel in the direction from Station B to Station A (i.e., the reverse channel) based on the training fields of the sounding packet 208. Station A then generates an estimate of the forward channel using the estimate of the reverse channel and generates a steering vector for use in downlink transmissions. As illustrated in FIG. 2, during a time period 214, Station A transmits a data packet 64 using the steering vector generated in the interval 212.

In some embodiments, the AP 14 conducts an implicit beamforming procedure that is at least substantially transparent with respect to the client station 25. The AP 14 utilizes transparent implicit beamforming to perform beamforming in a direction of the client station 25, according to an embodiment. According to an embodiment, to conduct implicit beamforming transparently with respect to a client station (e.g., the client station 25-1), the AP 14 determines an estimate of the reverse channel (e.g., the channel from the client station 25-1 to the AP 14) based on a data unit received from the client station 25-1, wherein the received data unit is not specifically related to beamforming (e.g., a non sounding data unit, also referred to herein as a "regular" data unit). More specifically, in this embodiment, the AP 14 receives from the client station 25-1 a regular data unit that does not specifically sound the channel but nonetheless includes training signals (e.g., in a preamble) that allow the AP 14 to determine or estimate characteristics of the reverse channel. Similar to standard implicit beamforming, the AP 14 then computes an estimate of the forward channel from the estimate of the reverse channel by assuming channel reciprocity, and, based on the forward channel estimate, computes a steering matrix to be used for beamforming in the direction of the client station 25-1, according to an embodiment.

Figure 3:
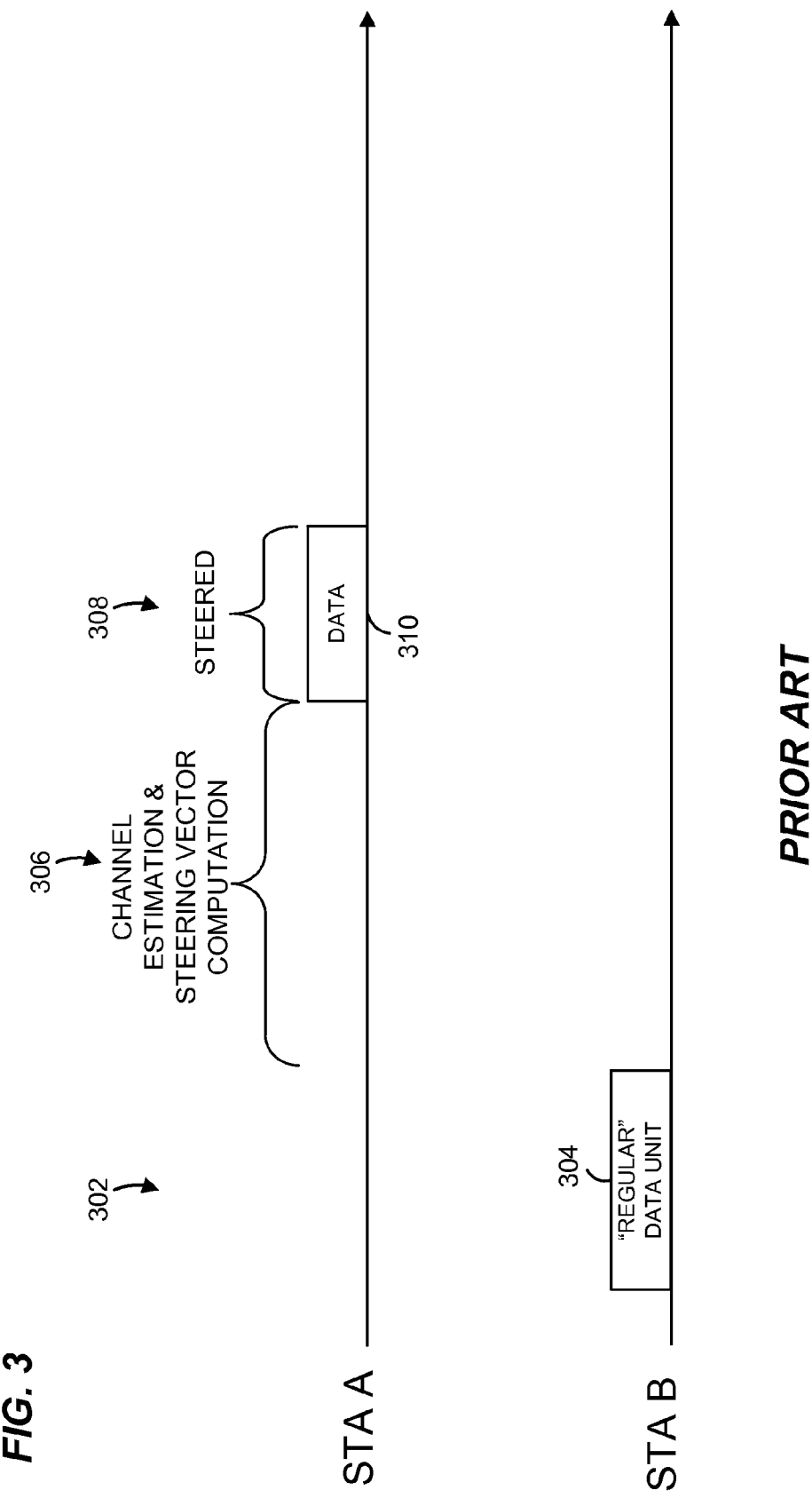
FIG. 3 is a timing diagram of another prior art implicit beamforming technique.

FIG. 3 is a timing diagram illustrating one example of a transparent implicit beamforming technique, according to an embodiment. In FIG. 3, Station A is a beamformer and Station B is a beamformee. Referring to FIG. 1, in one embodiment, the AP 14 is the beamformer (Station A), and the client station 25-1 is the beamformee (Station B). In another embodiment, the client station 25-1 is the beamformer (Station A), and the AP 14 is the beamformee (Station B).

As illustrated in FIG. 3, during the time interval 302, Station B transmits a regular data unit 304 to Station A. As used herein, a regular data unit is a non-sounding data unit used in any procedure other than channel sounding, e.g., data exchange, modulation and coding scheme (MCS) feedback, etc., and the data unit 304 is a communication frame, a data packet, etc. According to an embodiment, the data unit 304 is not transmitted in response to a request to transmit a sounding packet. Station B transmits the data unit 304 for a purpose unrelated to sounding the MIMO channel, in an embodiment. For example, in an embodiment, the data unit 304 is a data packet that includes a data payload and a number of training fields corresponding to the number of spatial or space-time streams used for transmitting the payload. In general, in at least some embodiments, the implicit beamforming procedure of FIG. 3 is conducted transparently with respect to the Station B.

During time interval 306, Station A estimates the reverse channel between Stations A and B based on the training signals included in the data unit 304, estimates the forward channel using the estimate of the reverse channel, and determines a steering matrix to be used in transmitting a data unit 310 to Station B during a time interval 308. In some embodiments, the regular data 304 includes training data that allows Station A to only partially estimate the reverse channel. In one such embodiment, for example, Station B includes three antennas but transmits the data unit 304 to Station A via only two of the antennas (i.e., via two spatial streams). In this case, in some situations, the data unit 304 includes training signals that allow Station A to only determine a partial channel estimate (in this case at most a two dimensions out of a possibility of three). Accordingly, in this embodiment, in at least some situations, Station A utilizes a partial channel estimate to generate a steering matrix which provides at least some channel directivity in the direction Station B.

With continued reference to FIG. 3, in mathematical terms, according to an embodiment, a signal received by Station B from Station A is represented as:

$$y_B = H_{AB} Q_{steer} s_A + n \quad \text{Equation 1}$$

where $s_A$ is a $N_{ss} \times 1$ dimensional vector representing the signal transmitted by Station A, $y_B$ is an $N_{RX} \times 1$ dimensional vector representing the signal received by Station B, n is a suitable $N_{RX} \times 1$ dimensional vector representation of additive noise, $H_{AB}$ is a $N_{RX} \times N_{TX}$ dimensional matrix representation of the forward channel from Station A to Station B, and $Q_{steer}$ an $N_{TX} \times NS_{SS}$ dimensional spatial mapping matrix applied to the transmitted signal $s_A$ to steer the transmission of the signal $s_A$ from Station A in the direction of Station B (where $N_{TX}$ is the number of transmit antennas at Station A, $N_{RX}$ is the number of receive antennas at Station B, and $N_{ss}$ is the number of spatial or space-time streams used for transmitting the signal $s_A$). In various embodiments and/or scenarios, Station A computes the spatial mapping matrix $Q_{steer}$ in accordance with non-standard implicit beamforming techniques described herein.

In some such embodiments and/or scenarios, Station A obtains channel state information (CSI) that describes one or more characteristics of the one or more spatial streams associated with the reverse channel (e.g., the gain, the phase, the signal to noise ratio (SNR), etc.) based on a data unit received from Station B (e.g., the data unit 304 of FIG. 3). Continuing with the mathematical model of Equation 1, the CSI corresponding to the reverse channel is represented in a matrix format, according to one embodiment, as a two-dimensional channel matrix $H_{BA}$ corresponding to the reverse from Station B to Station A that specifies, in each element, a channel gain parameter for a spatial stream defined by the corresponding transmit antenna (at Station B) and a receive antenna (at Station A). To generate an estimate of the forward channel (e.g., $H_{AB}$ of Equation 1), Station A calculates the transpose of the matrix $H_{BA}$ that describes the reverse channel. In doing so, Station A assumes that the MIMO channel between Stations A and B is symmetrical so that the forward channel and the reverse channel can be considered to be reciprocal.

However, channel estimation is typically conducted at baseband, and therefore, according to an embodiment, the observed channel contains the equivalent RF responses of the transmit and the receive chains which, according to an embodiment, are not identical in the same device (e.g., Station A). In this embodiment, channel reciprocity of the forward and reverse channels between Stations A and B is therefore impaired. To reduce or account for the errors introduced by RF chain impairments in an implicit beamforming technique, in one embodiment, Station A does not assume complete reciprocity and generates a calibration matrix to be applied to the signals to be transmitted (i.e., the output signals) during the beamforming process to compensate for measured differences between the actual forward and reverse channels.

In particular, according to an embodiment, Station A first determines a calibration matrix that at least partially compensates for RF impairments caused by transmit and receive chain imbalance in Station A. Then, each time a new steering matrix is to be calculated for the forward channel, the beamforming technique applies the calibration matrix to a steering matrix determined using an implicit beamforming technique, so that, once the calibration matrix is determined, the transmitter performs implicit beamforming using a measured description of the reverse channel to produce an estimate of the forward channel. Alternatively, in some embodiments, Station A calculates calibration matrices for its receive chains, so that once the correction matrix is determined, Station A applies the calibration matrices to the reverse channel estimation to generate a compensated reverse channel estimate, and generates a forward channel estimate using the compensated reverse channel estimate to use in transmit beamforming. In general, a communication device develops a calibration matrix by conducting channel estimation of the forward channel, receiving channel estimation information corresponding to the forward channel from a peer device (via a feedback message, for example), and using the two estimates to generate a matrix that would restore reciprocity to the MIMO channel. However, in some embodiments in which Station B does not support channel estimation feedback and/or other calibration procedures, and Station A generates the calibration matrix by conducting a self-calibration technique.

Because wireless communication channels are often characterized by time-varying conditions due to factors such as fading, shielding, interference and user mobility, in an embodiment, a steering matrix determined based on channel characteristics of the communication channel between Station A and Station B is frequently updated based on the current characteristics of the communication channel. On the other hand, the calibration procedure is conducted infrequently, compared with steering matrix updates, according to some embodiments. For example, in one embodiment, the calibration procedure is conducted only upon association of the device into the network, upon switching to a new channel, or upon changes in the environment (e.g. a change in temperature).

When conducting implicit beamforming, Station A generally updates the steering matrix for station B based on uplink data units that Station A frequently receives from station B, in an embodiment. As discussed above, in at least some situations, an uplink data unit includes a number of training fields corresponding to the number of spatial or space-time streams used for transmitting the uplink data unit that allows Station A to obtain only a partial estimate of the communication channel, according to an embodiment. In some cases, in this embodiment, the partial estimate is insufficient to achieve desired directivity in the direction of Station B. In some such situations, updating a steering matrix based on such partial channel estimate results in degradation in performance compared to performance that is achieved using an older channel estimate that includes more dimensions. Further, in some situations, if an uplink data unit is transmitted using a smaller channel bandwidth compared to channel bandwidth used for transmitting downlink data units from Station A to Station B, then a steering matrix determined based on the smaller bandwidth uplink data unit does not provide directivity in the entire frequency band of the downlink communication channel. In such situations, the computed steering matrix at most provides directivity in the frequency band corresponding to the channel in which the uplink data unit traveled, according to an embodiment.

To represent partial channel estimation in mathematical terms, according to an embodiment, it is assumed that an uplink data unit is transmitted using multiple spatial streams through the use of an uplink spatial mapping matrix $Q_{UL}$ having dimensions of $N_T \times N_{STS\_UL}$, where here $N_T$ is the number of transmit antennas at the beamformer, and $N_{STS\_UL}$ is the number of spatial streams (and a corresponding number of training fields) associated with the uplink data unit. This data unit allows estimation of the equivalent uplink channel represented by the expression $H_{UL}Q_{UL}$, where $H_{UL}$ is a full dimensional ($N_T \times N_R$) channel matrix representing the reverse communications channel (i.e., the communication channel from the beamformee to the beamformer). The downlink steering matrix computed based on such channel estimate, in an embodiment, is represented as:

$$Q_{DL} = f(H_{DL}) = f(Q_{UL}^T H_{UL}^T) \qquad \text{Equation 2}$$

As seen from the above, in this embodiment, if the number of spatial streams $N_{STS\_UL}$ used for transmitting the uplink data unit equals the number of transmit antennas $N_T$ at the beamformee, the beamformer is able to obtain a full dimensional channel matrix H and to thereby compute a full dimensional downlink mapping matrix $Q_{DL}$. In this case, channel estimation based on the non-sounding uplink data unit is equivalent to a channel estimate that can be obtained from a sounding packet that fully sounds the communication channel. On the other hand, if the number of spatial streams $N_{STS\_UL}$ used for transmitting the uplink data unit is less than the number of transmit antennas $N_T$ at the beamformee, then the beamformer cannot obtain a full dimensional channel estimate based on the uplink data unit. A case of $N_{STS\_UL} < N_T$ is sometimes referred to herein as an "insufficient sounding" case. Because the steering matrix is computed based on a partial channel estimate, only partial beamforming gain is obtained for downlink data units transmitted using one to $N_{STS\_UL}$ spatial streams in an insufficient sounding case, according to an embodiment. Further, in an embodiment, downlink data units transmitted using a number of spatial streams greater than $N_{STS\_UL}$ are transmitted omni-directionally because a downlink steering matrix for such data units cannot be determined in the insufficient sounding case. As a result, in some such situations, data units transmitted in close and/or in mid range communications generally do not benefit from beamforming gain because such data units are typically transmitted in the downlink direction using a maximum number of available spatial streams to achieve high data rates generally associated with close to mid range communications, while uplink data units in such situations are not necessarily transmitted using all available spatial streams.

Similarly, full beamforming gain is not achieved in a situation in which a larger bandwidth downlink data packet is transmitted using a steering matrix computed based on an uplink data packet transmitted in a smaller bandwidth, according to an embodiment. As an example, in an embodiment, in a 20/40 MHz basic service set (BSS) 802.11n communication system, full beamforming gain for a 40 MHz downlink data unit cannot be achieved using a channel estimate computed based on a 20 MHz uplink data unit. In particular, according to an embodiment, a steering matrix computed based on a 20 MHz uplink data unit will provide beamforming gain only in the portion of the 40 MHz channel that corresponds to the 20 MHz band in which the uplink data unit used for developing the steering matrix had been transmitted. For example, in orthogonal frequency division multiplexing case, a steering matrix computed based on a 20 MHz uplink data unit provides gain for data tones corresponding to the 20 MHz half of the 40 MHz band that corresponds to the 20 MHz uplink channel in which the uplink data unit used for channel estimation had been transmitted, and may not provide any beamforming gain for data tones corresponding to the other half of the 40 MHz channel at least in some situations. In some such embodiments and/or scenarios, rather than applying a partial steering matrix to downlink data units, the AP 14 does not apply a steering matrix to 40 MHz transmissions at all, thereby entirely forgoing potential beamforming gain.

In some embodiments and/or scenarios, however, the AP 14 may not be able to determine the bandwidth of an uplink data unit until after training signals in the uplink data unit have been received.

Figure 4:
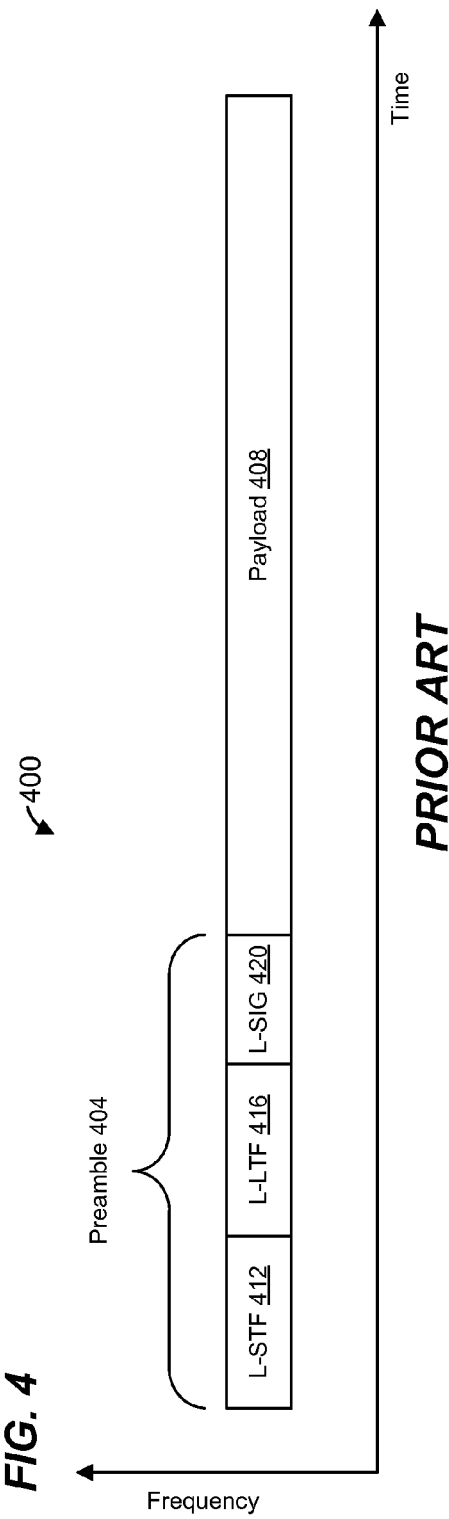
FIG. 4 is a diagram of an IEEE 802.11a/g packet format.

FIG. 4 is a diagram of a data unit 400 that conforms to the IEEE 802.11a standard and the IEEE 802.11g standard. The data unit 400 includes a preamble 404 and a payload 408. The preamble 404 includes a legacy short training field (L-STF) 412, a legacy long training field (L-LTF) 416, and a legacy signal field (L-SIG) 420. The data unit 400 spans 20 MHz. In some embodiments, when a communication device (e.g., AP 14) receives the data unit 400, the communication device can utilize the received L-LTF 416 to calculate or update the steering matrix. As discussed above, however, full beamforming gain for transmitted data units having a bandwidth wider than 20 MHz (e.g., 40 MHz, 80 MHz, 160 MHz, etc.) cannot be achieved using a channel estimate computed based on the 20 MHz-wide data unit 400.

Figure 5:
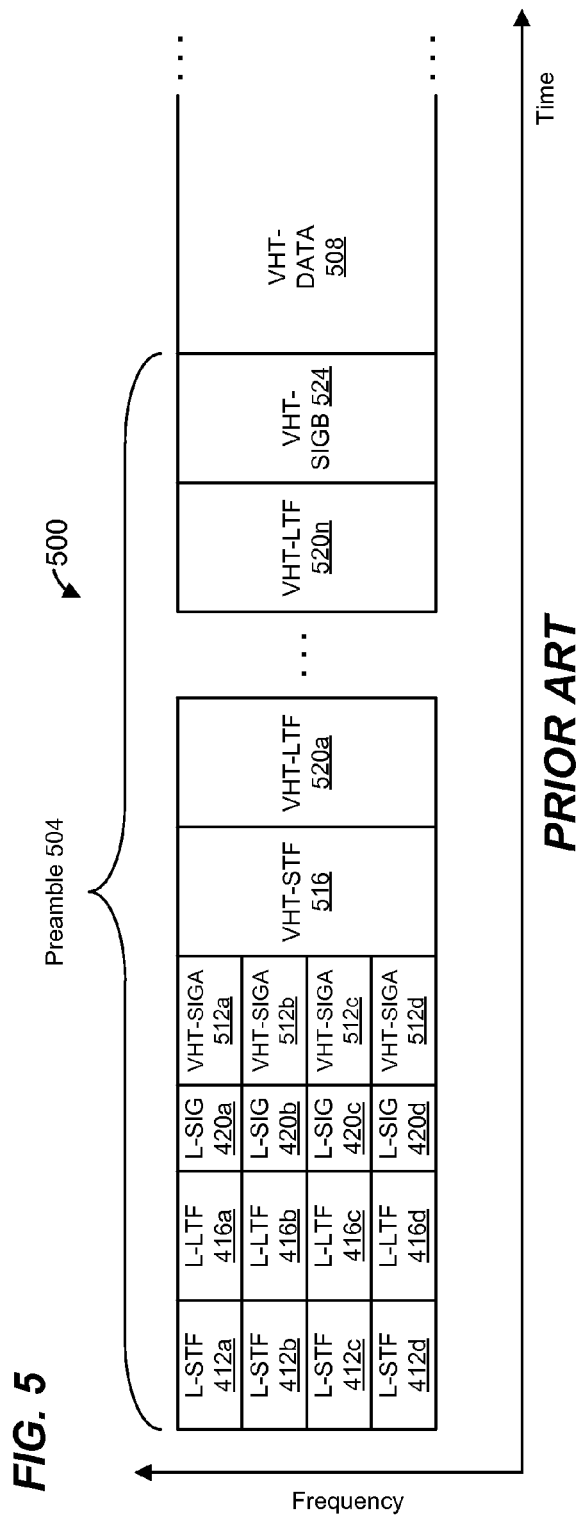
FIG. 5 is a diagram of an IEEE 802.11ac packet format.

FIG. 5 is a diagram of a data unit 500 that conforms to the IEEE 802.11ac standard. The data unit 500 includes a preamble 504 and a payload 508. Unlike the data unit 400 of FIG. 4, the data unit 500 spans 80 MHz. Thus, the payload 508 and certain fields of the preamble 504 span 80 MHz. The preamble 504 includes a plurality of L-STFs 412 duplicated across different frequency portions to span the entire 80 MHz of the data unit 500. Similarly, the preamble 504 includes a plurality of L-LTFs 416 and a plurality L-SIGs 420 duplicated across the different frequency portions to span the entire 80 MHz of the data unit 500. In other embodiments, the data unit 500 spans another suitable bandwidth greater than 20 MHz but other than 80 MHz. For example, in some embodiments, the spans 40 MHz, 120

MHz, 160 MHz, etc. In such embodiments, the L-STFs 412, the L-LTFs 416, and the L-SIGs 420 are duplicated across the different frequency portions to span the entire bandwidth of the data unit 500.

Additionally, the preamble 504 includes a plurality of very high throughput signal fields (A) (VHT-SIGAs) 512 duplicated across the different frequency portions to span the entire 80 MHz of the data unit 500. The preamble 504 further includes a very high throughput short training field (VHT-STF) 516, a plurality of very high throughput long training fields (VHT-LTFs) 520, and a very high throughput signal field (B) (VHT-SIGB) 524. In some embodiments, when a communication device (e.g., AP 14) receives the data unit 500, the communication device can utilize the received VHT-LTFs 520 to calculate or update the steering matrix. In these embodiments, the communication device receiving the data unit 500 can determine a bandwidth of the data unit 500 (e.g., by processing one of the VHT-SIGAs 512) prior to receiving the VHT-LTFs 520.

Figure 6:
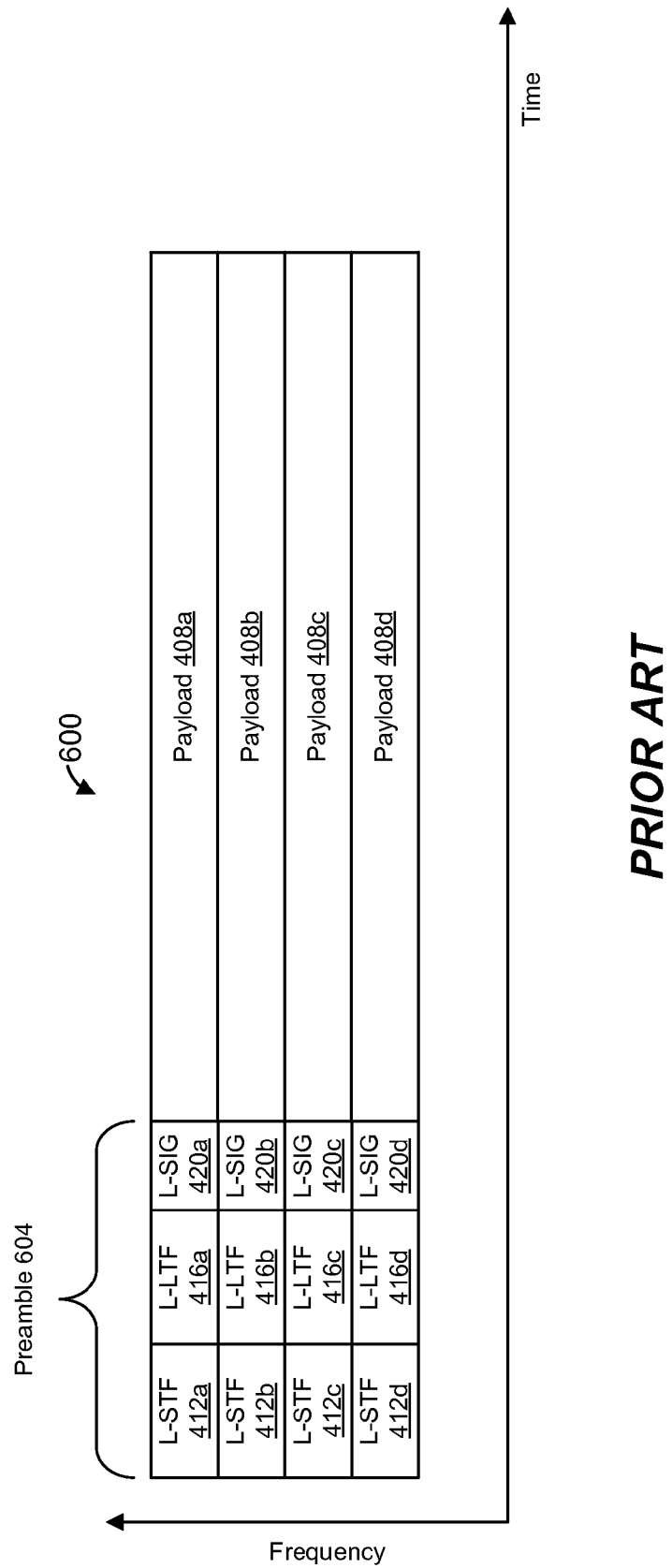
FIG. 6 is a diagram of an IEEE 802.11ac duplication mode packet format.

FIG. 6 is a diagram of a data unit 600 that conforms to the IEEE 802.11ac standard. The data unit 600 is referred to a duplication mode data unit 600 because the data unit 600 generally corresponds to the data unit 400 of FIG. 4 duplicated across different frequency portions to span a bandwidth of 80 MHz. For example, the data unit 600 includes i) a preamble 604 with fields duplicated across different frequency portions, and ii) a payload 608 duplicated across different frequency portions. In particular, the preamble 604 includes a plurality of L-STFs 412 duplicated across different frequency portions to span the entire 80 MHz of the data unit 600. Similarly, the preamble 604 includes a plurality of L-LTFs 416 and a plurality L-SIGs 420 duplicated across the different frequency portions to span the entire 80 MHz of the data unit 600. In other embodiments, the data unit 600 spans another suitable bandwidth greater than 20 MHz but other than 80 MHz. For example, in some embodiments, the data unit 600 spans 40 MHz, 120 MHz, 160 MHz, etc. In such embodiments, the L-STFs 412, the L-LTFs 416, and the L-SIGs 420 are duplicated across the different frequency portions to span the entire bandwidth of the data unit 600.

A legacy client station is capable of receiving and decoding a bandwidth portion of the data unit 600 (e.g., L-STF 412*a*, L-LTF 416*a*, L-SIG 420*a*, and payload 408*a*), in some embodiments.

The duplication mode data unit 600 is utilized, in some embodiments, for at least certain kinds of control packets such as acknowledgment packets (ACKs), block acknowledgment packets (BAs), etc. For example, in some embodiments, a communication protocol (e.g., defined by the IEEE 802.11ac standard) requires (at least in some modes of operation) that, in response to a first communication device receiving a packet from a second communication device (e.g., the AP 14), which packet spanning a bandwidth greater than 20 MHz (e.g., 40 MHz, 80 MHz, 160 MHz, etc.), the first communication device is to respond by transmitting an ACK or BA duplication mode packet that spans the bandwidth of the packet received from the second communication device.

In some embodiments, when a communication device (e.g., AP 14) receives the data unit 600, the communication device can utilize one L-LTFs 416 to calculate or update the steering matrix. Referring now to FIGS. 4 and 6, in prior art systems, a communication device receiving the data unit 400 or the data unit 600 may not be able to determine whether the bandwidth of the data unit 400/600 spans only 20 MHz or spans a larger bandwidth until after the L-LTFs 416 have been received. For example, a prior art communication device, when receiving the preamble 604, will only decode one 20 MHz portion of the preamble 604 (e.g., L-STF 412*a*, L-LTF 416*a*, and L-SIG 420*a*) and assume that the data unit 600 is a legacy packet (e.g., the data unit 400 of FIG. 4). Thus, in some prior art systems, a communication device, upon receiving the preamble 604, may assume that the data unit 600 spans only 20 MHz and thus does not utilize all of the L-LTFs 416 for generating/updating the steering matrix for transmitting over bandwidths greater than 20 MHz (e.g., 40 MHz, 80 MHz, 160 MHz, etc.).

Figure 7:
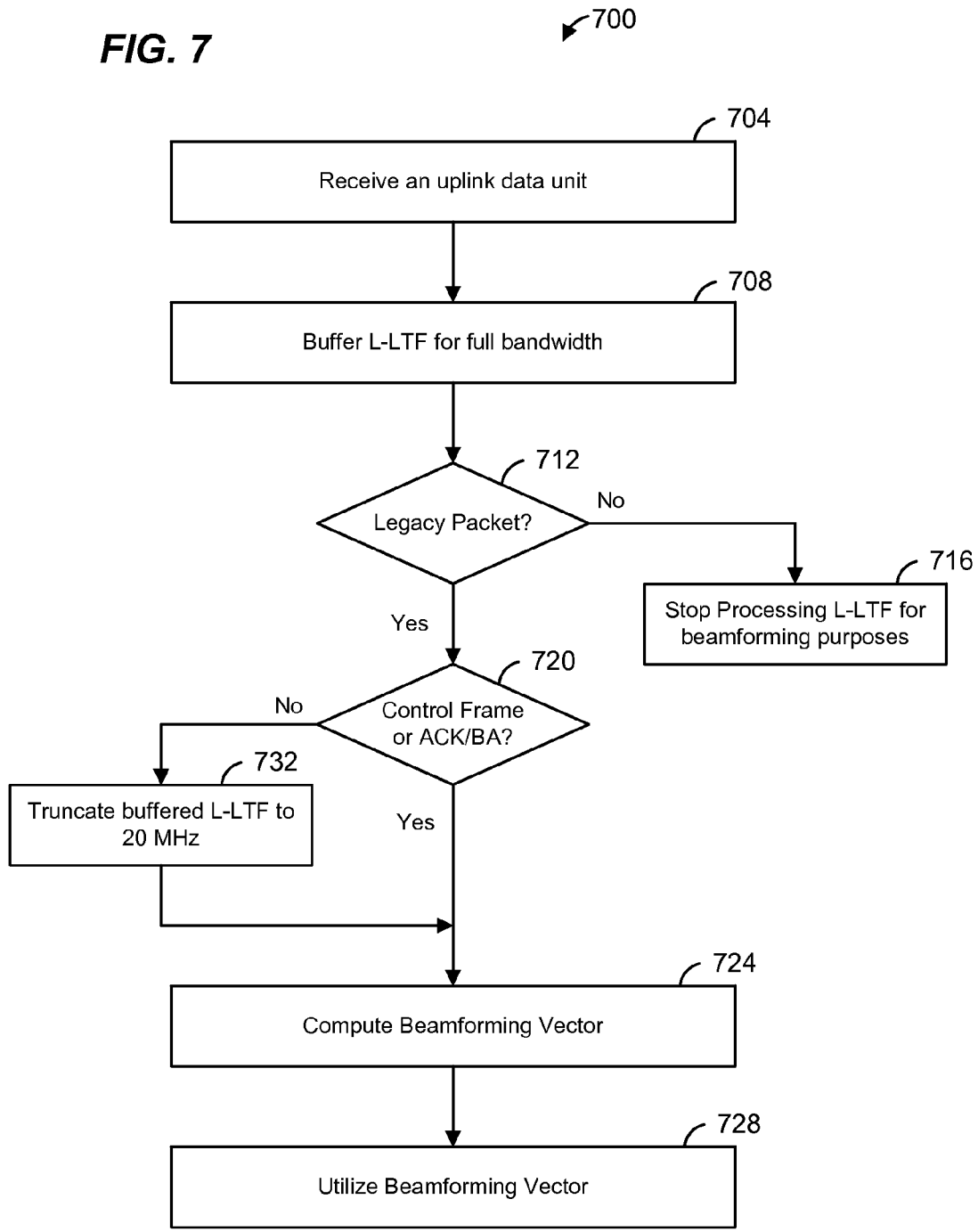
FIG. 7 is a flow diagram of an example method for implicit beamforming in a wireless communication system, according to an embodiment.

FIG. 7 is a flow diagram of an example method 700 for computing/updating and utilizing a steering matrix, according to an embodiment. The method enables more efficient use of data units such as the data unit 600 of FIG. 6 in beamforming training, in some embodiments. The method 700 is implemented by a network interface device, such as the network interface device 16 (FIG. 1) or the network interface device 27 (FIG. 1), in some embodiments. The method 700 is implemented by a PHY processing unit, such as the PHY processing unit 20 (FIG. 1) or the PHY processing unit 29 (FIG. 1), in some embodiments. In other embodiments, the method 700 is implemented by another suitable network interface device and/or PHY processing unit.

At block 704, a data unit is received at a network interface device. In an embodiment, the received data unit is an uplink data unit received at the network interface device 16. The received data unit includes one or more L-LTFs. For example, in some embodiments, the received data unit includes one or more L-LTFs such as with the data units 400, 500, and 600 of FIGS. 4-6.

At block 708, the network interface device buffers a portion of the received packet corresponding to the L-LTF(s) and for a full bandwidth in a memory device of or coupled to the network interface device (and/or of or coupled to a PHY processing unit). In an embodiment, the full bandwidth corresponds to a maximum bandwidth being utilized by the network interface device in a network (e.g., the network 10). In another embodiment, the full bandwidth corresponds to a bandwidth utilized by the network interface device to transmit a packet prior to receiving the data unit at block 704, and where the data unit received at block 704 is responsive to the packet. For example, in some embodiments, the data unit received at block 704 is an ACK, BA, or other control packet that is responsive to a previous packet transmitted by the network interface device.

At block 712, it is determined whether the data unit received at block 704 is formatted such that at least a bandwidth portion of the data unit can be decoded by a legacy client station. For example, the data unit 400 (FIG. 4) can be decoded by a legacy client station. As another example, a bandwidth portion of the data unit 600 (FIG. 6) can be decoded by a legacy client station. In an embodiment, block 712 comprises analyzing i) modulation of an L-SIG field in a preamble of the data unit and ii) modulation of a symbol (e.g., an OFDM symbol) that follows the L-SIG field, and determining whether modulation of the L-SIG field and modulation of the symbol that follows the L-SIG field signals that the data unit is an IEEE 802.11a packet (e.g., formatted according to the IEEE 802.11a standard) or an IEEE 802.11g packet (e.g., formatted according to the IEEE 802.11g standard). In an embodiment, for duplication mode packets such as the data unit 600 of FIG. 6, modulation of the L-SIG field and modulation of the symbol that follows the L-SIG field signals that the data unit is an IEEE 802.11a packet (e.g., formatted according to the IEEE 802.11a standard) or an IEEE 802.11g packet (e.g., formatted according to the IEEE 802.11g standard). For brevity, determining whether a data unit formatted such that at least a bandwidth portion of the data unit can be decoded by a legacy client station is sometimes referred to subsequently as determining whether a data unit is a legacy packet. However, it is to be understood that such a "legacy packet" could also be a duplication mode packet such as the data unit 600 of FIG. 6.

If is determined at block 712 that the data unit is not a legacy packet, the flow proceeds to block 716. At block 716, processing of the L-LTF for the purpose of computing/updating a beamforming (e.g., steering) matrix is stopped. For example, the network interface device may instead process another portion of the data unit (e.g., VHT-LTFs 520) for the purpose of computing/updating a beamforming matrix.

On the other hand, if is determined at block 712 that the data unit is a legacy packet, the flow proceeds to block 720. At block 720, it is determined whether the packet received at block 704 is a type of packet that the first communication protocol (e.g., the IEEE 802.11ac standard) specifies should be transmitted in a duplication mode. For example, some control packets are required by the IEEE 802.11ac standard to be transmitted in a duplication mode. As another example, the IEEE 802.11ac standard requires that ACK packets and BA packets be transmitted in a duplication mode. Thus, in various embodiments, block 712 includes one or more of i) determining whether the data unit is a type of control packet required to be transmitted in a duplication mode, ii) an ACK packet, or iii) a BA packet. In some embodiments, block 720 comprises analyzing the L-SIG field to determine whether the L-SIG field indicates that the data unit is a particular type of control packet or some other type of packet that the first communication protocol (e.g., the IEEE 802.11ac standard) specifies should be transmitted in a duplication mode. In some embodiments, block 720 comprises analyzing a first few data symbols in a MAC header of the data unit to determine whether the data unit is an ACK packet, a BA packet, or some other type of packet that the first communication protocol (e.g., the IEEE 802.11ac standard) specifies should be transmitted in a duplication mode.

If is determined at block 720 that the data unit is a type of packet that should be transmitted in a duplication mode, the flow proceeds to block 724. At block 724, the portion of the received packet buffered at block 708 is utilized to compute or update a beamforming matrix. In an embodiment, the portion of the received packet buffered at block 708 is utilized to compute or update a beamforming vector corresponding to the communication device that transmitted the data unit received at block 704.

At block 728, the beamforming matrix computed or updated at block 724 is utilized when transmitting to the communication device that transmitted the data unit received at block 704. In an embodiment, the beamforming vector computed or updated at block 724 is utilized when transmitting to the communication device that transmitted the data unit received at block 704.

On the other hand, if is determined at block 720 that the data unit is not a type of packet that should be transmitted in a duplication mode, the flow proceeds to block 732. At block 732, the portion of the received packet buffered at block 708 is truncated to 20 MHz. Then, at block 724, the portion of the received packet buffered at block 708 (truncated to 20 MHz) is utilized to compute or update a beamforming matrix.

Figure 8:
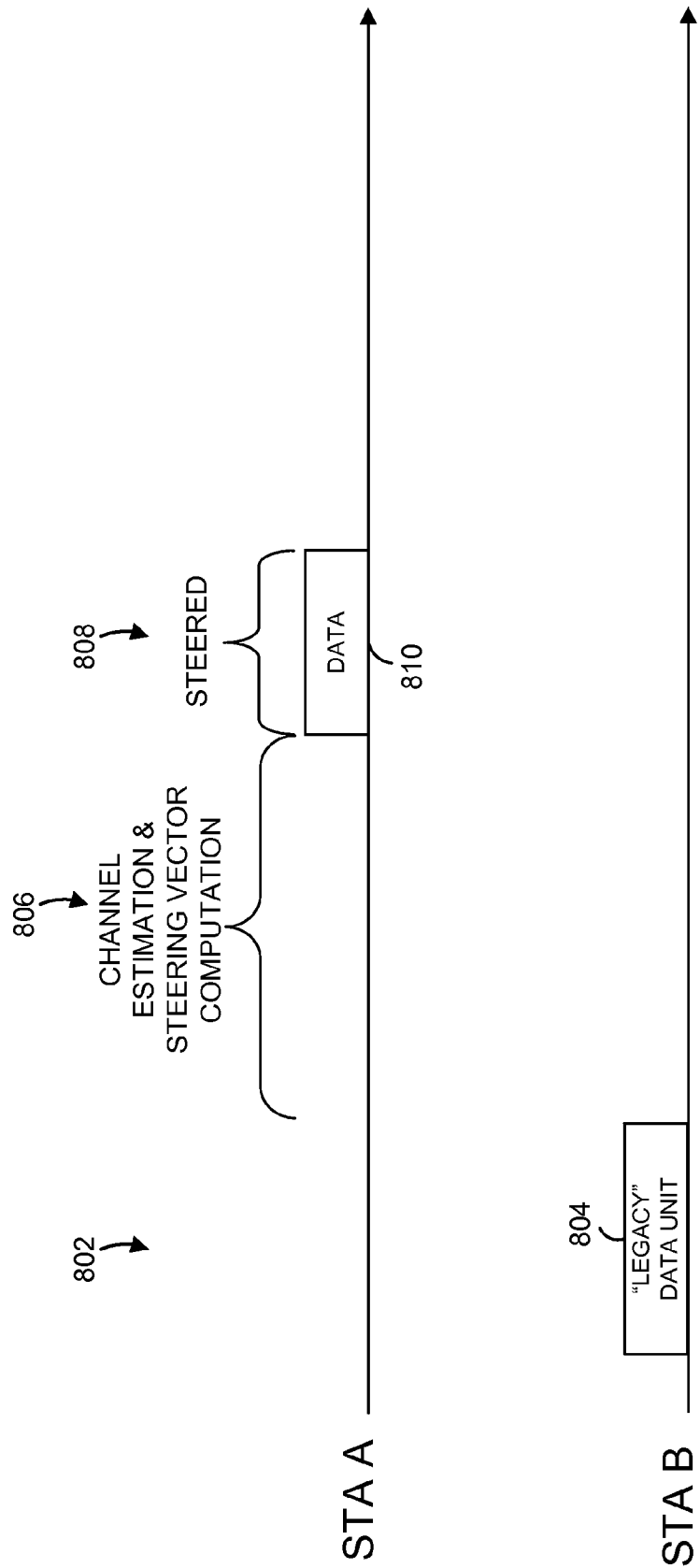
FIG. 8 is a timing diagram of an example implicit beamforming technique, according to an embodiment.

FIG. 8 is a timing diagram generally illustrating the method 700 of FIG. 7, according to an embodiment. In FIG. 8, Station A is a beamformer and Station B is a beamformee. Referring to FIG. 1, in one embodiment, the AP 14 is the beamformer (Station A), and the client station 25-1 is the beamformee (Station B). In another embodiment, the client station 25-1 is the beamformer (Station A), and the AP 14 is the beamformee (Station B).

As illustrated in FIG. 8, during the time interval 802, Station B transmits a legacy data unit 804 to Station A. According to an embodiment, the data unit 804 is not transmitted in response to a request to transmit a sounding packet. Station B transmits the data unit 804 for a purpose unrelated to sounding the MIMO channel, in an embodiment. For example, in an embodiment, the data unit 804 is a control packet, an ACK packet, a BA packet, etc., as described above. In general, in at least some embodiments, the implicit beamforming procedure of FIG. 8 is conducted transparently with respect to the Station B. Referring now to FIGS. 7 and 8, blocks 704 and 708 occur during the time interval 802.

During time interval 806, Station A estimates the reverse channel between Stations A and B based on the training signals included in the legacy data unit 804, estimates the forward channel using the estimate of the reverse channel, and determines a steering matrix to be used in transmitting a data unit 810 to Station B during a time interval 808. In some embodiments, block 724 occurs during time interval 806 and block 728 occurs during time interval 808. For example, in an embodiment, STA A utilizes the beamsteering matrix computed/updated at block 724 and during time interval 806 to steer the data unit 810 to STA B during time interval 808.

Figure 9:
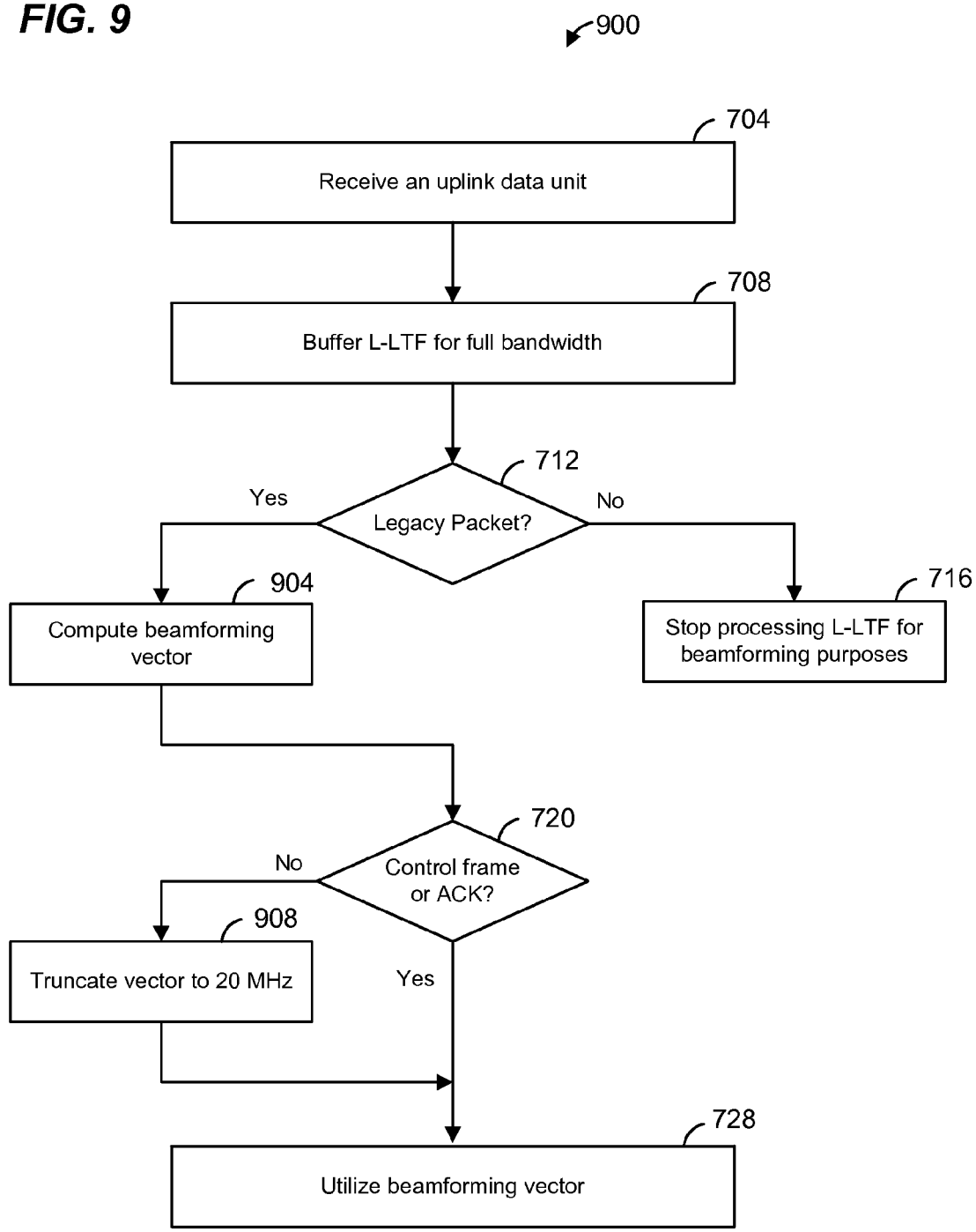
FIG. 9 is a flow diagram of another example method for implicit beamforming in a wireless communication system, according to an embodiment.

FIG. 9 is a flow diagram of another example method 900 for computing/updating and utilizing a steering matrix, according to an embodiment. The method enables more efficient use of data units such as the data unit 600 of FIG. 6 in beamforming training, in some embodiments. The method 900 is implemented by a network interface device, such as the network interface device 16 (FIG. 1) or the network interface device 27 (FIG. 1), in some embodiments. The method 900 is implemented by a PHY processing unit, such as the PHY processing unit 20 (FIG. 1) or the PHY processing unit 29 (FIG. 1), in some embodiments. In other embodiments, the method 900 is implemented by another suitable network interface device and/or PHY processing unit.

The method 900 includes like-numbered blocks as in the method 700 of FIG. 7. Thus, such like-numbered blocks already discussed above will not be discussed again in detail.

If is determined at block 712 that the data unit is a legacy packet, the flow proceeds to 904. At block 904, the portion of the received packet buffered at block 708 is utilized to compute or update a beamforming matrix. In an embodiment, the portion of the received packet buffered at block 708 is utilized to compute or update a beamforming vector corresponding to the communication device that transmitted the data unit received at block 704.

After block 904, the flow proceeds to block 720. If is determined at block 720 that the data unit is not a type of packet that should be transmitted in a duplication mode, the flow proceeds to block 908. At block 908, the steering matrix computed/updated at block 904 is truncated to 20 MHz. Then, at block 728, the truncated beamforming matrix is utilized.

In some embodiments, if is determined at block 720 (in one or both of methods 700 and 900) that the data unit is not a type of packet that should be transmitted in a duplication mode, the data unit received at block 704 may not be used at all to compute or update a beamforming matrix.

In some embodiments, the network interface device transmits one or more packets at a particular desired bandwidth in order to prompt another communication device to transmit the data unit received at block 704 in one or both of methods 700 and 900. For example, in some embodiments, the network interface device transmits one or more packets at a particular desired bandwidth in order to prompt the other communication device to transmit an ACK packet or a BA packet (which is the data unit received at block 704), where the ACK/BA is a duplication mode packet that spans the particular desired bandwidth.

In some embodiments, a duplication mode packets transmitted using OFDM includes guard tones and/or DC tones that match up with tones for which beamsteering is to be utilize. Thus, in some embodiments in which duplication mode packets include guard tones and/or DC tones that match up with tones for which beamsteering is needed, other tones in the duplication mode packets are utilized for computing the beamsteering matrix elements corresponding to the guard tones and/or DC tones of the duplication mode packet that match up with tones for which beamsteering is needed. For example, in some embodiments, non-DC and non-guard tones closest to the guard tones and/or DC tones of the duplication mode packet that match up with tones for which beamsteering is needed are utilized.

For example, in one embodiment corresponding to a 40 MHz-wide duplication mode packet, a tone at index −33 is used for index −32, a tone at index 31 is used for index 32, a tone at index −6 is used for index −4, and a tone at index 6 is used for indices 2 and 4. As another example, in one embodiment corresponding to a 80 MHz-wide duplication mode packet, a tone at index −70 is used for index −66, a tone at index −58 is used for index −62, a tone at index 70 is used for index 66, a tone at index 58 is used for index 62, a tone at index −6 is used for index −2, and a tone at index 6 is used for index 2.

In some embodiments, techniques described in the present application can be combined with techniques describe in U.S. patent application Ser. No. 13/491,541, entitled "Uplink Training for MIMO Implicit Beamforming," filed on Jun. 7, 2012, which is incorporated by reference herein. For example, if it is determined that a number of spatial streams used for transmitting the data unit received at block 704 is less than a number of transmit antennas at the beamformee, then the data unit received at block 704 is not used to compute/update the beamforming matrix, in some embodiments.

In the above discussion, the terms beamforming matrix and steering matrix are used interchangeably. Additionally, in some embodiments, a beamforming vector or steering vector is a particular instance of a beamforming matrix, i.e., a beamforming or steering vector is a type of beamforming matrix.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

While the present invention has been described with reference to specific examples, which are intended to be illustrative only and not to be limiting of the invention, changes, additions and/or deletions may be made to the disclosed embodiments without departing from the scope of the invention. For example, one or more portions of methods or techniques described above may be performed in a different order (or concurrently) and still achieve desirable results.

What is claimed is:

1. A method for beamforming in a multiple input multiple output (MIMO) communication system, the method comprising:
    receiving, at a first communication device, a data unit from a second communication device via a MIMO communication channel;
    buffering, in a memory of the first communication device, training signals in the data unit, wherein buffering assumes that the data unit spans a bandwidth greater than a maximum bandwidth of a legacy first communication protocol;
    determining, at the first communication device, whether the data unit is formatted such that at least a bandwidth portion of the data unit conforms to the legacy first communication protocol;
    determining, at the first communication device, whether the data unit is of a type that a second communication protocol requires to be transmitted in a duplication mode such that the data unit would span a bandwidth greater than the maximum bandwidth of the legacy first communication protocol; and
    if it is determined that i) the data unit is formatted such that at least the bandwidth portion of the data unit conforms to the legacy first communication protocol, and ii) the data unit is of a type that the second communication protocol requires to be transmitted in the duplication mode,
        utilizing, at the first communication device, a transmit beamforming matrix generated using the training signals buffered assuming that the data unit spans the bandwidth greater than the maximum bandwidth of the legacy first communication protocol; and
    if it is determined that at least one of i) the data unit is not formatted such that at least the bandwidth portion of the data unit conforms to the legacy first communication protocol, and ii) the data unit is not of a type that the second communication protocol requires to be transmitted in the duplication mode, one of
        a) using only a portion of the training signals buffered assuming that the data unit spans the bandwidth greater than the maximum bandwidth of the legacy first communication protocol for the purpose of generating the transmit beamforming matrix, or
        b) not using the training signals buffered assuming that the data unit spans the bandwidth greater than the maximum bandwidth of the legacy first communication protocol for the purpose of generating the transmit beamforming matrix.

2. The method of claim 1, wherein:
determining whether the data unit is of a type that a second communication protocol requires to be transmitted in a duplication mode is performed only if it is determined that the data unit is formatted such that the at least the bandwidth portion of the data unit conforms to the legacy first communication protocol; and
the method further comprises: if it is determined that the data unit is not formatted such that the at least the bandwidth portion of the data unit conforms to the legacy first communication protocol,
not using the training signals buffered assuming that the data unit spans the bandwidth greater than the maximum bandwidth of the legacy first communication protocol for the purpose of generating a transmit beamforming matrix.

3. The method of claim 1, further comprising:
if it is determined that i) the data unit is formatted such that at least the bandwidth portion of the data unit conforms to the legacy first communication protocol and ii) the data unit is not of a type that the second communication protocol requires to be transmitted in the duplication mode,
truncating, at the first communication device, the buffered training signals to correspond to the maximum bandwidth of the legacy first communication protocol,
generating, at the first communication device, the transmit beamforming matrix to correspond to the maximum bandwidth of the legacy first communication protocol using the truncated buffered training signals, and
utilizing, at the first communication device, the transmit beamforming matrix generated using the truncated buffered training signals.

4. The method of claim 1, further comprising:
generating, at the first communication device, the transmit beamforming matrix using the buffered training signals such that the transmit beamforming matrix is for the bandwidth greater than the maximum bandwidth of the legacy first communication protocol; and
if it is determined that i) the data unit is formatted such that at least the bandwidth portion of the data unit conforms to the legacy first communication protocol and ii) the data unit is not of a type that the second communication protocol requires to be transmitted in the duplication mode,
truncating, at the first communication device, the transmit beamforming matrix to correspond to the maximum bandwidth of the legacy first communication protocol, and
utilizing, at the first communication device, the truncated transmit beamforming matrix.

5. The method of claim 1, further comprising:
if it is determined that i) the data unit is formatted such that at least the bandwidth portion of the data unit conforms to the legacy first communication protocol and ii) the data unit is not of a type that the second communication protocol requires to be transmitted in the duplication mode,
using only the portion of the training signals buffered assuming that the data unit spans the bandwidth greater than the maximum bandwidth of the legacy first communication protocol for the purpose of generating a transmit beamforming matrix.

6. The method of claim 1, wherein determining whether the data unit is formatted such that at least a bandwidth portion of the data unit conforms to the legacy first communication protocol comprises determining whether the data unit is formatted such that at least a bandwidth portion of the data unit conforms to at least one of i) the IEEE 802.11a standard, or ii) the IEEE 802.11g standard.

7. The method of claim 1, wherein determining whether the data unit is of a type that the second communication protocol requires to be transmitted in the duplication mode comprises determining whether the data unit is an acknowledgment packet.

8. The method of claim 1, wherein determining whether the data unit is of a type that the second communication protocol requires to be transmitted in the duplication mode comprises determining whether the data unit is a block acknowledgment packet.

9. The method of claim 1, wherein determining whether the data unit is of a type that the second communication protocol requires to be transmitted in the duplication mode comprises determining whether the data unit is a type of control packet that the second communication protocol requires to be transmitted in the duplication mode.

10. The method of claim 1, further comprising:
transmitting, with the first communication device, one or more packets to prompt the second communication device to transmit the data unit of a type that the second communication protocol requires to be transmitted in the duplication mode.

11. An apparatus for use in a communication system having a first communication device and a second communication device, the apparatus comprising:
a network interface device having one or more integrated circuits, the network interface device including:
a medium access control (MAC) processing unit implemented on the one or more integrated circuits, and
a physical layer (PHY) processing unit coupled to the MAC processing unit, the PHY processing unit implemented on the one or more integrated circuits;
wherein the PHY processing unit is configured to:
receive a data unit transmitted by the second communication device via a multiple input multiple output (MIMO) communication channel, and
buffer, in a memory of or coupled to the network interface device, training signals in the data unit, wherein the buffering assumes that the data unit spans a bandwidth greater than a maximum bandwidth of a legacy first communication protocol; and
wherein the network interface device is further configured to:
determine whether the data unit is formatted such that at least a bandwidth portion of the data unit conforms to the legacy first communication protocol,
determine whether the data unit is of a type that a second communication protocol requires to be transmitted in a duplication mode such that the data unit would span a bandwidth greater than the maximum bandwidth of the legacy first communication protocol, and
if is determined that i) the data unit is formatted such that at least the bandwidth portion of the data unit conforms to the legacy first communication protocol, and ii) the data unit is of a type that the second communication protocol requires to be transmitted in the duplication mode,
utilize a transmit beamforming matrix generated using the training signals buffered assuming that the data unit spans the bandwidth greater than the maximum bandwidth of the legacy first communication protocol; and wherein the network interface device is further configured to:

if it is determined that at least one of i) the data unit is not formatted such that at least the bandwidth portion of the data unit conforms to the legacy first communication protocol, and ii) the data unit is not of a type that the second communication protocol requires to be transmitted in the duplication mode, one of
  a) use only a portion of the training signals buffered assuming that the data unit spans the bandwidth greater than the maximum bandwidth of the legacy first communication protocol for the purpose of generating the transmit beamforming matrix, or
  b) not use the training signals buffered assuming that the data unit spans the bandwidth greater than the maximum bandwidth of the legacy first communication protocol for the purpose of generating the transmit beamforming matrix.

12. The apparatus of claim 11, wherein the network interface device is configured to:
  determine whether the data unit is of a type that a second communication protocol requires to be transmitted in a duplication mode only if it is determined that the data unit is formatted such that the at least the bandwidth portion of the data unit conforms to the legacy first communication protocol; and
  if it is determined that i) the data unit is not formatted such that the at least the bandwidth portion of the data unit conforms to the legacy first communication protocol, not use the training signals buffered assuming that the data unit spans the bandwidth greater than the maximum bandwidth of the legacy first communication protocol for the purpose of generating a transmit beamforming matrix.

13. The apparatus of claim 11, wherein the network interface device is configured to:
  if it is determined that i) the data unit is formatted such that at least the bandwidth portion of the data unit conforms to the legacy first communication protocol and ii) the data unit is not of a type that the second communication protocol requires to be transmitted in the duplication mode,
    truncate the buffered training signals to correspond to maximum bandwidth of the legacy first communication protocol,
    generate the transmit beamforming matrix to correspond to the maximum bandwidth of the legacy first communication protocol using the truncated buffered training signals, and
    utilize the transmit beamforming matrix generated using the truncated buffered training signals.

14. The apparatus of claim 11, wherein the network interface device is configured to:
  generate the transmit beamforming matrix using the buffered training signals such that the transmit beamforming matrix is for the bandwidth greater than the maximum bandwidth of the legacy first communication protocol; and if it is determined that i) the data unit is formatted such that at least the bandwidth portion of the data unit conforms to the legacy first communication protocol and ii) the data unit is not of a type that the second communication protocol requires to be transmitted in the duplication mode,
    truncate the transmit beamforming matrix to correspond to the maximum bandwidth of the legacy first communication protocol, and
    utilize the truncated transmit beamforming matrix.

15. The apparatus of claim 11, wherein the network interface device is configured to:
  if it is determined that i) the data unit is formatted such that at least the bandwidth portion of the data unit conforms to the legacy first communication protocol and ii) the data unit is not of a type that the second communication protocol requires to be transmitted in the duplication mode,
    use only the portion of the training signals buffered assuming that the data unit spans the bandwidth greater than the maximum bandwidth of the legacy first communication protocol for the purpose of generating a transmit beamforming matrix.

16. The apparatus of claim 11, wherein the network interface device is configured to determine whether the data unit is formatted such that at least a bandwidth portion of the data unit conforms to the legacy first communication protocol comprises at least by determining whether the data unit is formatted such that at least a bandwidth portion of the data unit conforms to at least one of i) the IEEE 802.11a standard, or ii) the IEEE 802.11g standard.

17. The apparatus of claim 11, wherein the network interface device is configured to determine whether the data unit is of a type that the second communication protocol requires to be transmitted in the duplication mode comprises at least by determining whether the data unit is an acknowledgment packet.

18. The apparatus of claim 11, wherein the network interface device is configured to determine whether the data unit is of a type that the second communication protocol requires to be transmitted in the duplication mode at least by determining whether the data unit is a block acknowledgment packet.

19. The apparatus of claim 11, wherein the network interface device is configured to determine whether the data unit is of a type that the second communication protocol requires to be transmitted in the duplication mode at least by determining whether the data unit is a type of control packet that the second communication protocol requires to be transmitted in the duplication mode.

20. The apparatus of claim 11, wherein the network interface device is configured to:
  cause the first communication device to transmit one or more packets to prompt the second communication device to transmit the data unit of a type that the second communication protocol requires to be transmitted in the duplication mode.

* * * * *